United States Patent
Hara et al.

[11] Patent Number: 6,007,155
[45] Date of Patent: Dec. 28, 1999

[54] ANTI-RATTLE GUIDE ASSEMBLY FOR SUPPORTING AN ARMREST OR OTHER STRUCTURE MOVEABLE BETWEEN EXTENDED AND RETRACTED POSITIONS

[75] Inventors: Masanori Hara, Hilliard; Ichiro Sasaki, Dublin; John Hwang, Hilliard, all of Ohio

[73] Assignee: Honda Giken Kogyo Kabushiki Kaisha, Tokyo, Japan

[21] Appl. No.: 09/100,560

[22] Filed: Jun. 19, 1998

Related U.S. Application Data

[62] Division of application No. 08/891,947, Jul. 14, 1997.

[51] Int. Cl.$^6$ .................................................. A47C 15/00
[52] U.S. Cl. .............................. 297/463.2; 248/298.1; 248/118.5
[58] Field of Search .............................. 248/298.1, 118.5, 248/424; 297/353, 383, 440.21, 411.36, 463.1, 463.2, 411.35

[56] References Cited

U.S. PATENT DOCUMENTS

| | | |
|---|---|---|
| 3,525,549 | 8/1970 | Knabusch et al. .................. 297/440.21 |
| 3,989,298 | 11/1976 | Cycowicz et al. ............. 297/440.21 X |
| 3,992,058 | 11/1976 | Mitjans . |
| 4,082,355 | 4/1978 | Knabusch et al. .................. 297/440.21 |
| 4,934,750 | 6/1990 | Eichler et al. . |
| 5,052,728 | 10/1991 | Fukumoto . |
| 5,184,871 | 2/1993 | LaPointe et al. .................. 297/440.21 |
| 5,253,923 | 10/1993 | Gootee . |
| 5,393,137 | 2/1995 | Bivens et al. . |
| 5,529,379 | 6/1996 | Stocker .................................. 297/410 |
| 5,681,116 | 10/1997 | Lin ...................................... 248/298.1 |

FOREIGN PATENT DOCUMENTS

| | | |
|---|---|---|
| 61-158535 | 10/1986 | Japan . |
| 62-174954 | 11/1987 | Japan . |

*Primary Examiner*—Milton Nelson, Jr.
*Attorney, Agent, or Firm*—Morgan & Finnegan LLP

[57] ABSTRACT

An anti-rattle guide assembly and method for supporting an armrest or other structure which is slidable between extended and retracted positions. The method of preventing rattling of a sliding mechanism include the steps of disposing a moveable rail member on a frame, placing the sliding mechanism in contact with the moveable rail member, and applying a force to the moveable rail member to bias the moveable rail member toward the sliding mechanism so as to maintain contact between the moveable rail member and the sliding mechanism. The guide assembly may be disposed between two such moveable guide rails or between a moveable guide rail and a fixed guide rail.

9 Claims, 4 Drawing Sheets

ANTI-RATTLE GUIDE ASSEMBLY FOR SUPPORTING AN ARMREST OR OTHER STRUCTURE MOVEABLE BETWEEN EXTENDED AND RETRACTED POSITIONS

This is a divisional of co-pending application Ser. No. 08/891,947 filed Jul. 14, 1997, herein incorporated by reference.

BACKGROUND OF THE INVENTION

1. Field of the Invention

This invention relates generally to a guide assembly for supporting a slidable object and more particularly to an anti-rattle guide assembly for supporting an object, such as an armrest, ashtray, door or drawer, which is slidable between extended and retracted positions.

2. Description of the Related Art

In the past, slidable objects such as automobile ashtrays have been mounted to their support structures in a variety of ways. Typically, such objects are mounted to their support structures by some form of rail assembly. For example, Japanese Patent Document No. 62-174954 is directed to an assembly using a series of rails for guiding movement of a sliding mechanism.

If the object is allowed to move too freely with respect to its housing, the slide assembly is likely to rattle, particularly if the slide assembly is used in some form of vehicle. Various attempts have been made to eliminate this rattle problem. For example, in U.S. Pat. No. 5,393,137, an anti-rattle tracking assembly having a pair of parallel spaced-apart rails and a series of flexible fingers are used to reduce rattling associated with relative motion between an ashtray and its housing. In other references, such as U.S. Pat. No. 4,934,750, a track rail-ball guidance arrangement is used in attempting to reduce rattling. Similarly, in Japanese Patent Document No. 61-158535, a roller mechanism is used to assist in the movement of the sliding assembly.

The use of such roller/ball mechanisms have failed, however, to alleviate rattling problems, particularly in view of the fact that debris may severely impair the ability of the roller/ball mechanism to operate properly. Other attempts to eliminate rattling have also been made including minimizing the tolerance between the rails of the sliding assembly to thereby provide a tight fit between the sliding assembly and its housing. Such attempts, however, have failed to alleviate rattling problems in view of (1) the difficulty of providing such tight tolerance levels during the manufacturing process and (2) the likelihood that repeated use of such sliding mechanisms will ultimately loosen the guide structure, thereby causing the structure to rattle. Accordingly, currently available techniques for eliminating rattling in sliding assemblies continue to suffer from disadvantages and are therefore inadequate.

SUMMARY OF THE INVENTION

The present invention alleviates the aforementioned drawbacks of the related art, by providing, in general, an anti-rattle guide and rail assembly, including a moveable rail, a sliding mechanism movably disposed along and in contact with the rail, and a biasing member disposed in contact with the rail to urge the rail toward the sliding mechanism to maintain contact therebetween. In one embodiment of the invention, the sliding mechanism is disposed between this rail and a fixed rail. In another embodiment, the invention includes a second rail and a second biasing member disposed in contact with the second moveable rail to urge the second rail toward the sliding mechanism to maintain contact therebetween, wherein the sliding mechanism is disposed between these two moveable rails.

The present invention also alleviates the aforementioned drawbacks of the related art by providing a method of preventing rattling of a guide assembly during movement with respect to a frame member, including the steps of placing at least a portion of the guide assembly in contact with a rail portion of a first block which is moveable orthogonally with respect to the frame member, placing an angled surface of the first block in contact with an angled surface of a second block, and placing a spring in engagement with the second block to urge the second block toward the first block, thereby urging the first block towards the guide assembly.

BRIEF DESCRIPTION OF THE DRAWINGS

These and other features of the present invention will become more fully apparent from the following detailed description when read in conjunction with the accompanying drawings where like reference numerals indicate corresponding parts throughout the several views, wherein.

DETAILED DESCRIPTION OF THE PREFERRED EMBODIMENTS OF THE PRESENT INVENTION

Figure 1:
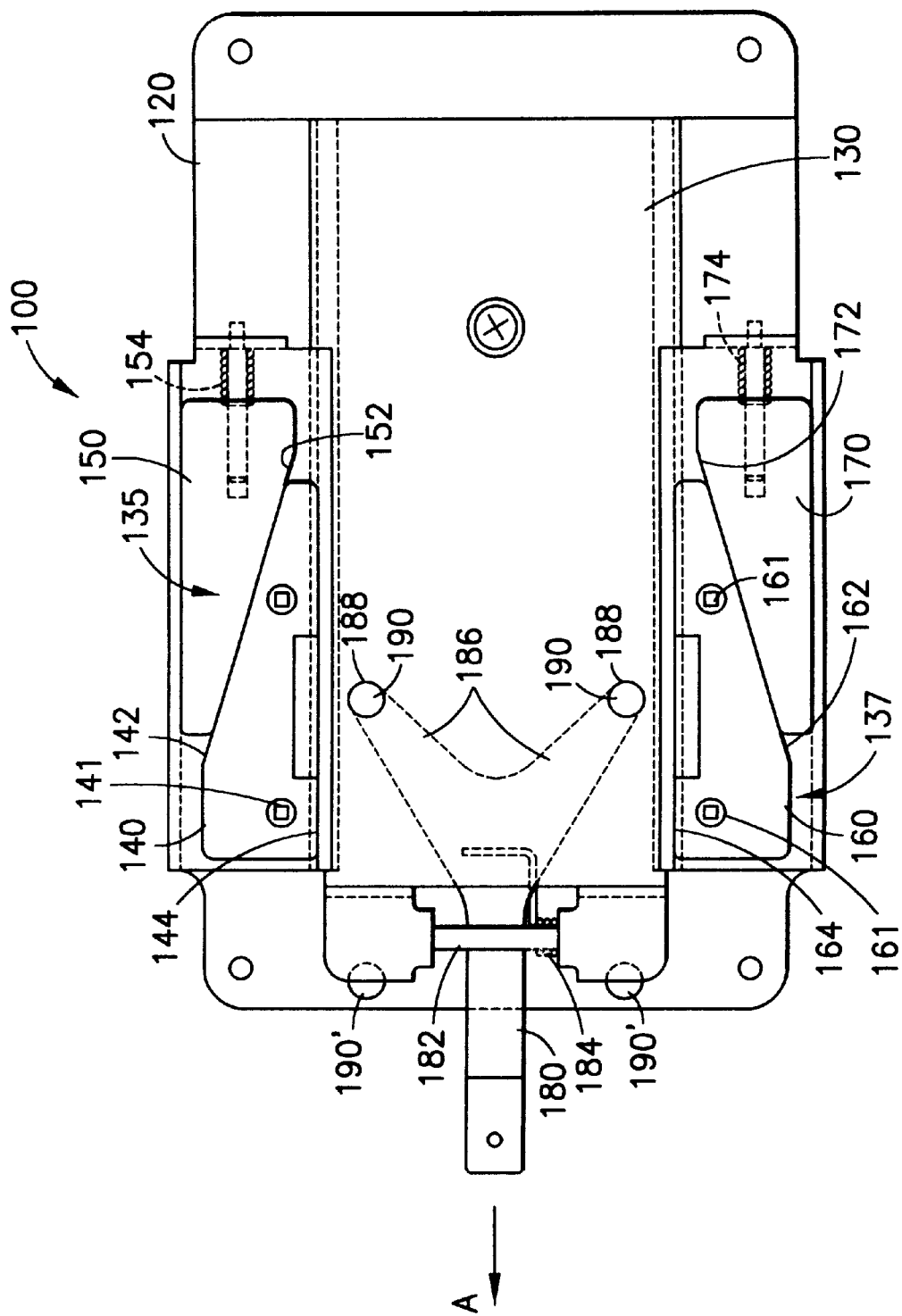
FIG. 1 is a top view of an anti-rattle guide assembly for supporting a body moveable between extended and retracted positions in accordance with one embodiment of the present invention.

With reference to the drawings, the preferred embodiments of the present invention will now be described in greater detail. With particular reference to FIG. 1, the present invention comprises generally an anti-rattle guide assembly 100 having a frame 120, a slide assembly 130, a first anti-rattle biasing assembly 135 and a second anti-rattle biasing assembly 137, each of which will now be described in greater detail below.

Slide assembly 130 is a carrier which is moveable from at least a retracted position to an extended position, although it is to be understood that slide assembly 130 may be variably moveable through a plurality of extended positions.

First anti-rattle biasing assembly 135 contains a first rail member 140 and a first biasing member 150. First rail member 140 is orthogonally moveable with respect to the slide assembly 130 along frame 120. First rail member 140 is movably attached to frame 120 by pins 141. In one embodiment of the present invention, first rail member 140 is disposed on frame 120 such that block portion 140 is not moveable longitudinally along slide assembly 130. Rail member 140 contains an angled surface 142 and a rail portion 144. Rail portion 144 is configured to engage at least a portion of slide assembly 130.

First biasing member 150 contains an angled surface 152 which engages angled surface 142 of first rail member 140.

A spring 154 is used to longitudinally urge said first biasing member 150 along frame member 120 and toward first rail member 140. The urging of first biasing member 150 toward first rail member 140 urges first rail member 140 orthogonally toward slide assembly 130, thereby maintaining contact between slide assembly 130 and rail portion 144 of first rail member 140. The elimination of space along this rail portion 144 produces a tight contact between first rail member 140 and slide assembly 130, thereby achieving the anti-rattle features of the present invention.

Second anti-rattle biasing assembly 137 contains a second rail member 160 and a second biasing member 170. Second rail member 160 is movably attached to frame 120 by pins 161, and contains an angled surface 162 and a rail 164, each of which are similar to pins 141, angled surface 142 and rail 144 of the first rail member 140. As with first biasing member 150, second biasing member 170 contains an angled surface 172 and is longitudinally urged by spring 174 along frame 130.

In this embodiment of the present invention, rail members 140, 160 serve as cam followers while biasing members 150, 170 serve as cams to maintain tight contact between the slide assembly 130 and rails 144, 164.

In this first embodiment of the present invention, the first and second anti-rattle biasing assemblies 135, 137 are disposed on opposite sides of the slide assembly 130, so as to urge first rail member 140 and second rail member 160 toward one another.

The anti-rattle guide assembly 100 of the present invention also includes a latch member 180 which is pivotally attached to slide assembly 130 at pivot 182. A spring 184 urges prongs 186 of latch member 180 toward the slide assembly 130. Engagement portions 188 on prongs 186 are used to engage engagement portion receiving holes 190, 190' in frame 120. A series of four engagement portion receiving holes 190, 190' are used. As shown in FIG. 1, engagement portions 188 are disposed in two engagement portion receiving holes 190 which serve to maintain the slide assembly 130 in a retracted position. By lifting latch member 180, and thereby overcoming the force of spring 184 which maintains engagement portions 188 in engagement portion receiving holes 190, engagement portions 188 are removed from this first set of engagement portion receiving holes 190. As such, the user may pull the latch member 180 in direction A until the slide assembly 130 reaches its extended position. In this extended position, the latch member 180 is released by the user. Upon release of the latch member 180, spring 184 serves to bias engagement portions 188 into engagement portion receiving holes 190', thereby locking the slide assembly 130 in its extended position.

Although in one embodiment of the present invention the frame 120 and slide assembly 130 are made of steel, it is to be understood that other materials may be used to manufacture these components. In addition, although first and second anti-rattle biasing assemblies 135, 137 are preferably made of nylon, it is to be understood that other materials may also be used in making these components.

Figure 2:
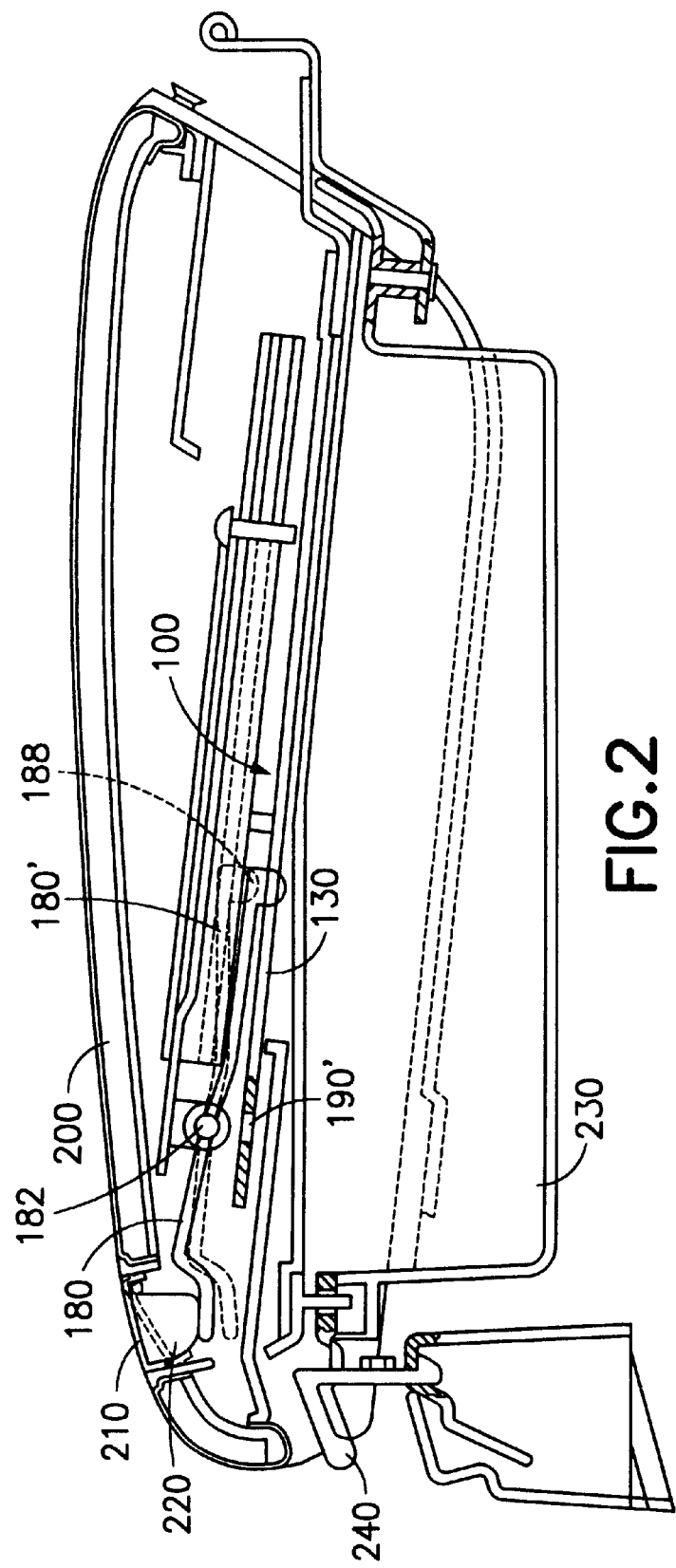
FIG. 2 is a side view of the anti-rattle guide assembly of FIG. 1 when used in a retractable automotive armrest.

With reference to FIG. 2, a side view of the embodiment of FIG. 1 in which the slide assembly 130 is attached to an armrest 200 is shown. It is to be understood that objects such as an ashtray, door or drawer may be attached to slide assembly 130 in place of armrest 200. The latch member 180 is shown both in a position in which engagement prongs 188 engage the engagement portion receiving holes 190 and in a position 180' in which the engagement portions 188 are released from engagement portion receiving holes 190. A release button 210 having an engaging member 220 is used in this embodiment of the present invention to engage the latch member 180. As such, in order to slide the armrest 200, a user (1) engages the release button 210 with their finger, thereby forcing the engagement member 220 into engagement with latch member 180 and thus releasing the engagement portions 188 from the engagement portion receiving holes 190, 190', and (2) slide armrest 200 to either its retracted or extended position. FIG. 2 also shows a storage compartment 230 disposed beneath the anti-rattle guide assembly 100 and armrest 200. To access the storage compartment 230, a user engages storage compartment release lever 240 to pivot the anti-rattle guide assembly 100 and armrest 200 away from the storage compartment 230.

Figure 3:
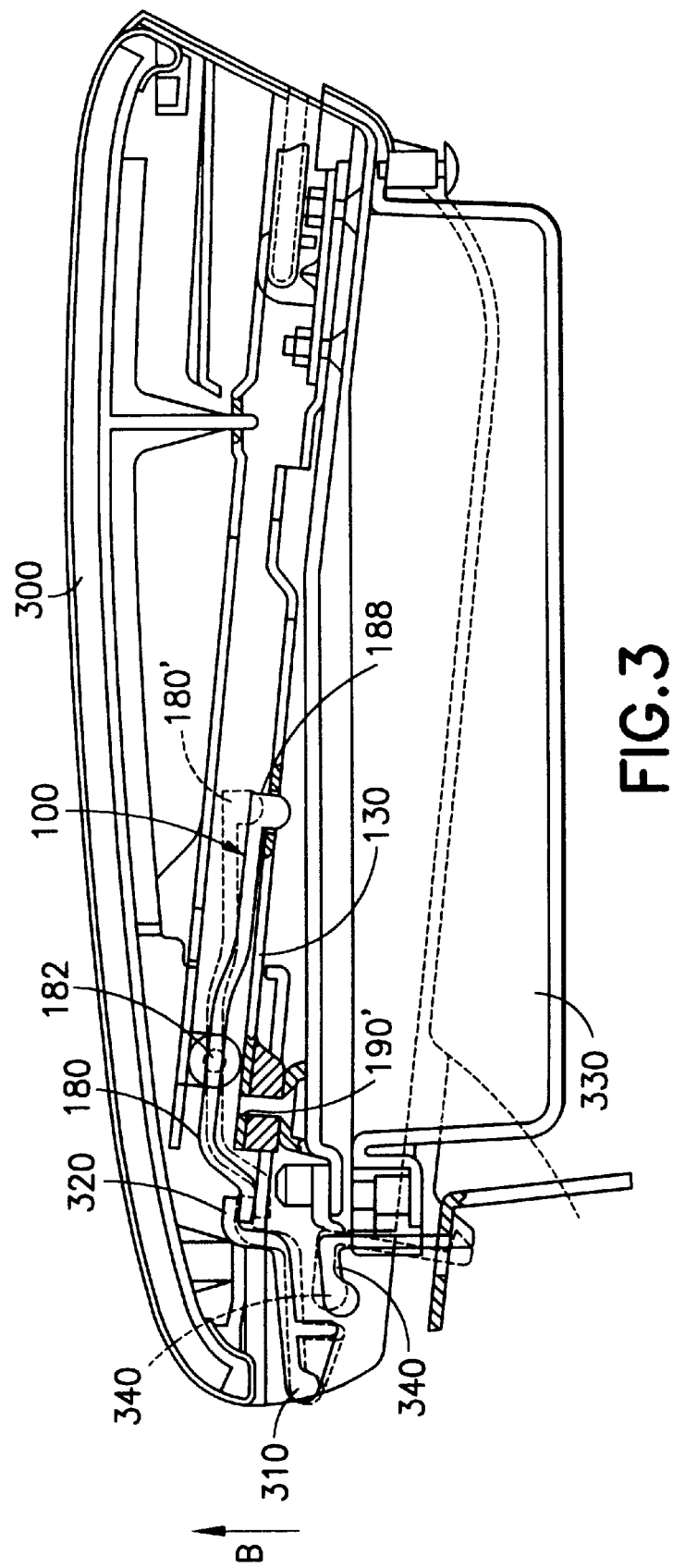
FIG. 3 is a side view of the anti-rattle guide assembly of FIG. 1 when used in a retractile automotive armrest in accordance with another embodiment of the present invention.

With reference to FIG. 3, an alternate embodiment of the present invention is shown. The embodiment of FIG. 3 differs from the embodiment of FIG. 2 in that armrest 300 is slidable between its extended and retracted positions through the use of a release lever 310 having an engagement portion 320. By pulling release lever 310 in direction B, the engagement portion 320 of the release lever 310 engages latch member 180 to release engagement portions 188 from engagement portion receiving holes 190, 190'. The embodiment of FIG. 3 also contains a storage compartment 330 and a storage compartment release lever 340.

Figure 4:
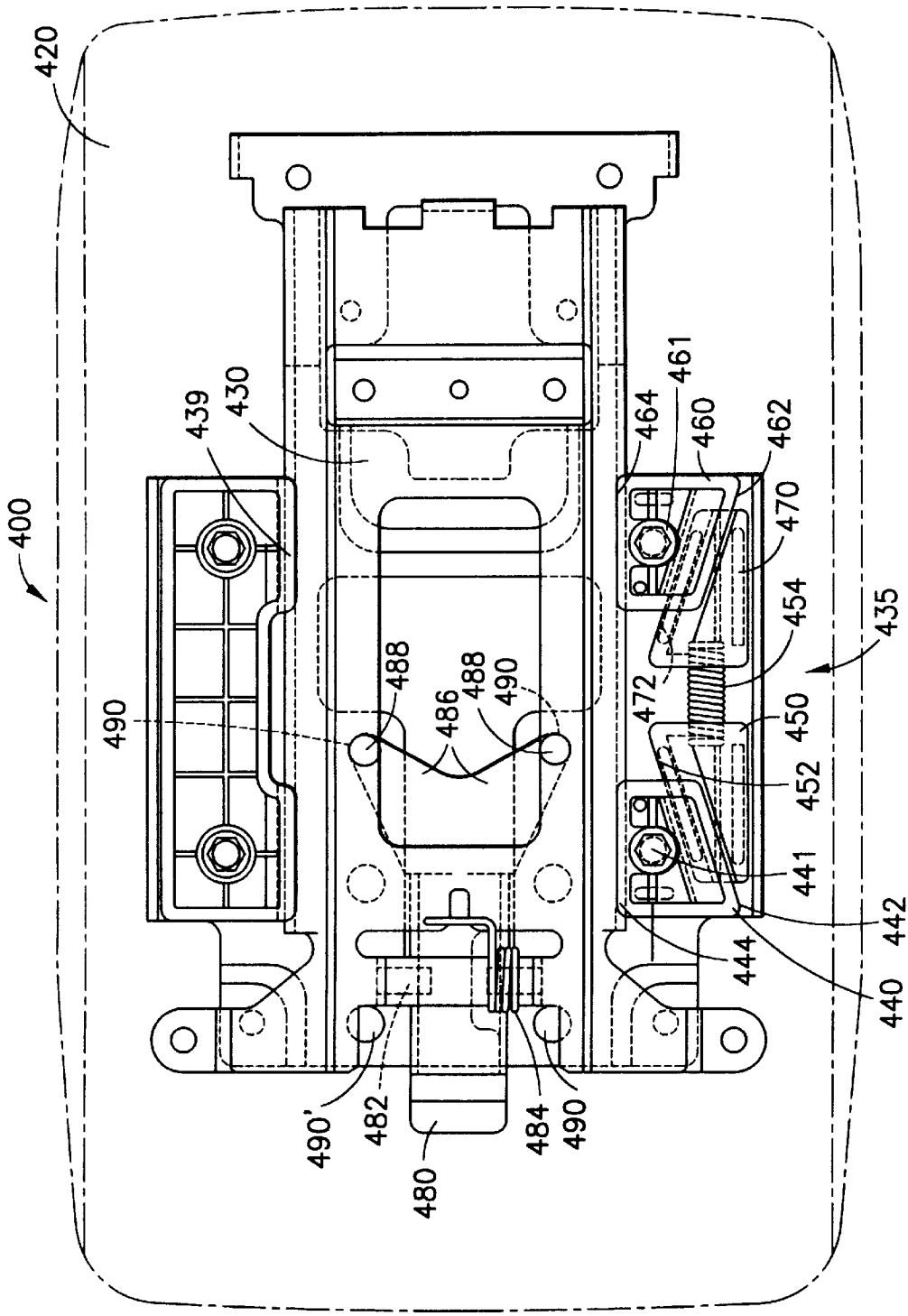
FIG. 4 is a top view of an anti-rattle guide assembly in accordance with another embodiment of the present invention.

With reference to FIG. 4, another embodiment of the present invention is shown. The embodiment of FIG. 4 contains an anti-rattle guide assembly 400, which includes a frame 420, a slide assembly 430, an anti-rattle biasing assembly 435 and an opposite fixed rail 439. The anti-rattle biasing assembly 435 contains a first rail member 440, a first biasing member 450, a second rail member 460, and a second biasing member 470. First rail member 440 is movably mounted to frame 420 by virtue of pin 441. The first rail member 440 contains an angled surface 442 and a rail portion 444. First biasing member 450 contains an angled surface 452 which engages angled surface 442 of first rail member 440, and a spring 454 which biases first biasing member 450 toward first rail member 440. Second rail member 460 is also movably attached to frame 420 by virtue of pin 461. Second rail member 460 contains an angled surface 462 and a rail portion 464. Second biasing member 470 contains an angled surface 472 and is urged by spring 454 towards second rail member 460.

Although in one embodiment of the present invention, one spring 454 is used, it is to be understood that two (or more) springs may be used. Each of these springs may be separately mounted on a portion (not shown) of frame 420 so that each biasing member 450, 470 is acted upon by a separate spring.

As such, the embodiment of FIG. 4 differs in general from the embodiment of FIG. 1 in that the entire anti-rattle biasing assembly is disposed along one side of the slide assembly 430. The anti-rattle biasing assembly 435 urges the slide assembly 430 towards fixed rail 439.

The embodiment of FIG. 4 also includes a latch member 480 which is pivotally attached to slide assembly 430 along pivot 482. The latch member 480 is urged toward the slide assembly 430 by spring 484. Prongs 486 of latch member 480 contain engagement portions 488 which engage engagement portion receiving holes 490.

Although the present invention has been described in terms of certain preferred embodiments, other embodiments that are apparent to those of ordinary skill in the art are also intended to be within the scope of the present invention. Accordingly, the scope of the present invention is intended to be limited only by the claims appended hereto.

What is claimed is:

1. A method of preventing rattling of a sliding mechanism which is moveable between extended and retracted positions, comprising:

disposing a moveable first rail member on a frame;

disposing a second rail member on said frame;

placing said sliding mechanism in contact with said moveable first rail member and said second rail member;

applying a force to said moveable first rail member to bias said moveable first rail member at least orthogonally toward said sliding mechanism so as to maintain constant contact between said moveable first rail member and said sliding mechanism while said sliding mechanism is in said extended and retracted positions and during movement between said positions; and maintaining constant contact between said second rail member and said sliding mechanism while said sliding mechanism is in said extended and retracted positions and during movement between said positions.

2. The method of claim 1 wherein said second rail member is a non-moveable second rail member further comprising:

disposing said sliding mechanism between and in constant contact with said moveable first rail member and said non-moveable second rail member.

3. The method of claim 1 wherein said applying step comprises:

disposing a moveable biasing member on said frame and in contact with said sliding mechanism to move alongside said sliding mechanism and to force said movable first rail member toward said sliding mechanism.

4. The method of claim 1 wherein said second rail member is a moveable second rail member; the method further comprising:

applying a force to said moveable second rail member to bias said moveable second rail member toward said sliding mechanism so as to maintain constant contact between said moveable second rail member and said sliding mechanism while said sliding mechanism is in said extended and retracted positions and during movement between said positions.

5. The method of claim 4 further comprising:

disposing said sliding mechanism between said moveable first and second rail members.

6. A method of preventing rattling of a guide assembly during movement of said guide assembly with respect to a frame member, comprising:

placing at least a portion of said guide assembly in constant contact with a rail portion of a first block orthogonally moveable with respect to said frame member;

placing an angled surface of said first block in contact with an angled surface of a second block;

placing a spring in engagement with said second block to urge said second block toward said first block, and to engage said angled surface of said second block with said angled surface of said first block to urge said first block towards said guide assembly and;

placing at least a portion of said guide assembly in constant contact with a rail portion of a third block.

7. The method of claim 6 further comprising the step of preventing relative longitudinal movement of said first block with respect to said frame member.

8. The method of claim 6 wherein said third block is orthogonally moveable with respect to said frame member further comprising:

placing an angled surface of said third block in contact with an angled surface of a fourth block; and placing a spring in engagement with said fourth block to urge said fourth block toward said third block, and to engage said angled surface of said fourth block with said angled surface of said third block to urge said third block toward said guide assembly.

9. The method of claim 8 further comprising:

disposing said first and third blocks on opposite sides of said guide assembly, such that said first and third blocks are urged by said springs toward one another.

* * * * *